United States Patent
Abrott (10) Patent No.: US 7,888,621 B2
(45) Date of Patent: Feb. 15, 2011

(54) SYSTEMS AND METHODS FOR AUTOMATICALLY ADJUSTING THE OPERATIONAL PARAMETERS OF A LASER CUTTER IN A PACKAGE PROCESSING ENVIRONMENT

(75) Inventor: Timothy J Abrott, Normandy Park, WA (US)

(73) Assignee: International Paper Co., Memphis, TN (US)

( * ) Notice: Subject to any disclaimer, the term of this patent is extended or adjusted under 35 U.S.C. 154(b) by 1174 days.

(21) Appl. No.: 11/536,853

(22) Filed: Sep. 29, 2006

(65) Prior Publication Data

US 2008/0078751 A1 Apr. 3, 2008

(51) Int. Cl.
*B23K 26/36* (2006.01)
*B23K 26/03* (2006.01)

(52) U.S. Cl. ............... 219/121.69; 219/121.61; 219/121.62; 700/166

(58) Field of Classification Search ............ 219/121.69, 219/121.83, 121.61, 121.68, 121.62; 700/166
See application file for complete search history.

(56) References Cited

U.S. PATENT DOCUMENTS

| | | | | |
|---|---|---|---|---|
| 4,638,145 A | * | 1/1987 | Sakuma et al. ......... | 219/121.83 |
| 5,464,960 A | * | 11/1995 | Hall et al. .............. | 219/121.69 |
| 5,772,656 A | * | 6/1998 | Klopotek ................ | 606/10 |
| 6,091,749 A | * | 7/2000 | Hoffmaster et al. ...... | 372/38.02 |
| 6,195,164 B1 | * | 2/2001 | Thompson et al. .......... | 356/604 |
| 6,369,898 B1 | * | 4/2002 | Van Saarloos et al. ...... | 356/497 |
| 7,750,267 B2 | * | 7/2010 | Van Denend et al. ... | 219/121.69 |
| 2002/0026181 A1 | * | 2/2002 | O'Donnell, Jr. .............. | 606/10 |
| 2005/0215986 A1 | * | 9/2005 | Chernyak et al. .............. | 606/5 |
| 2006/0133239 A1 | * | 6/2006 | Colburn et al. ............. | 369/47.5 |
| 2007/0173797 A1 | * | 7/2007 | Zickler ........................ | 606/10 |

FOREIGN PATENT DOCUMENTS

| | | | |
|---|---|---|---|
| DE | 19916081 A1 | * | 10/2000 |
| DE | 10150129 C1 | * | 4/2003 |
| JP | 1-233081 A | * | 9/1989 |
| JP | 2001-133324 A | * | 5/2001 |

* cited by examiner

Primary Examiner—Geoffrey S Evans
(74) Attorney, Agent, or Firm—Matthew M. Eslami (57) ABSTRACT

A system includes a cutting station having a laser cutter for cutting surface marks, score lines, holes, slots, flaps, panels, etc. into a selected substrate, an image capture device for capturing digital image data associated with the selected substrate, and a computing system for controlling the cutting process. The computing system 32 initiates a calibration test cycle that 1) cuts a test pattern into the selected substrate; and 2) analyzes the test pattern that was cut into the selected substrate. Based on the results of the analysis of the captured image, the system adjusts the operational parameters of the laser cutter during a subsequent packaging production run utilizing the same substrate type.

5 Claims, 7 Drawing Sheets

SYSTEMS AND METHODS FOR AUTOMATICALLY ADJUSTING THE OPERATIONAL PARAMETERS OF A LASER CUTTER IN A PACKAGE PROCESSING ENVIRONMENT

BACKGROUND

Laser cutters have been utilized for years in the package processing industry for processing containerboard blanks and the like. Heretofore, laser cutters have been utilized for making various types of cuts, such as surface cuts for removing paint or producing other substrate surface markings, complete cuts through the top linerboard or complete cuts through the top linerboard and corrugated medium for making scoring cuts, and complete cuts through the substrate (i.e., full cuts) for making cut outs, slots, and the outer perimeter shapes for panels and flaps. Each type of cut mentioned above has a particular depth, and as such, each cut requires different operating parameters of the laser cutter to accomplish such depths.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present invention, a method is provided for automatically adjusting the operational parameters of a laser cutter. The method includes cutting a calibration test pattern into a first substrate of a preselected type by a laser cutter, wherein the test pattern includes a plurality of spaced apart cuts of varying depths. The method also includes the steps of analyzing the calibration test pattern cut into the first substrate utilizing computerized image analysis and modulating the laser cutter during a subsequent processing of the first substrate or a second substrate of the same type as the first substrate.

In accordance with another aspect of the present invention a method is provided for automatically adjusting the operational parameters of a laser cutter. The method includes the steps of inputting data indicative of a first type of substrate, generating calibration test pattern control signal based on the inputted data; controlling a laser cutter with the control signals for cutting a calibration test pattern into a substrate; receiving image data representative of the calibration test pattern; analyzing the image data; and controlling subsequent cutting of one or more substrates of the first type based on the analyzed image data.

DESCRIPTION OF THE DRAWINGS

The foregoing aspects and many of the attendant advantages of this invention will become more readily appreciated as the same by reference to the following detailed description, when taken in conjunction with the accompanying drawings, wherein.

DETAILED DESCRIPTION

Embodiments of the present invention are directed to systems and methods for automatically adjusting the operational parameters of a laser cutter in a package processing environment. The following description provides examples of systems and methods for determining the laser cutter operational parameters needed for producing the desired cuts (e.g., surface marks, paint removal, score lines, full cut lines such as holes, slots, cut-outs, etc.) on a selected packaging substrate. The following description further provides examples of systems and methods for automatically adjusting the operational parameters of the laser cutter during a packaging production run based on such operational parameter determinations so that the desired depth and quality of cut is achieved. In several embodiments, the operational parameters to be adjusted include but are not limited to laser cutting power, laser cutting speed, laser pulse characteristics (e.g., amplitude, frequency, waveform), etc.

Embodiments of the present invention provide automated operational parameter adjustment techniques, the result of which decreases the possibilities of wasted processing time and product stock (e.g., substrate material). Applications of the embodiments of the systems and methods of the present invention may reduce labor costs, extend operating hours at the processing facility, etc. It should be apparent that the examples described below are only illustrative in nature, and therefore, such examples should not be considered as limiting the scope of the present invention, as claimed.

Figure 1:
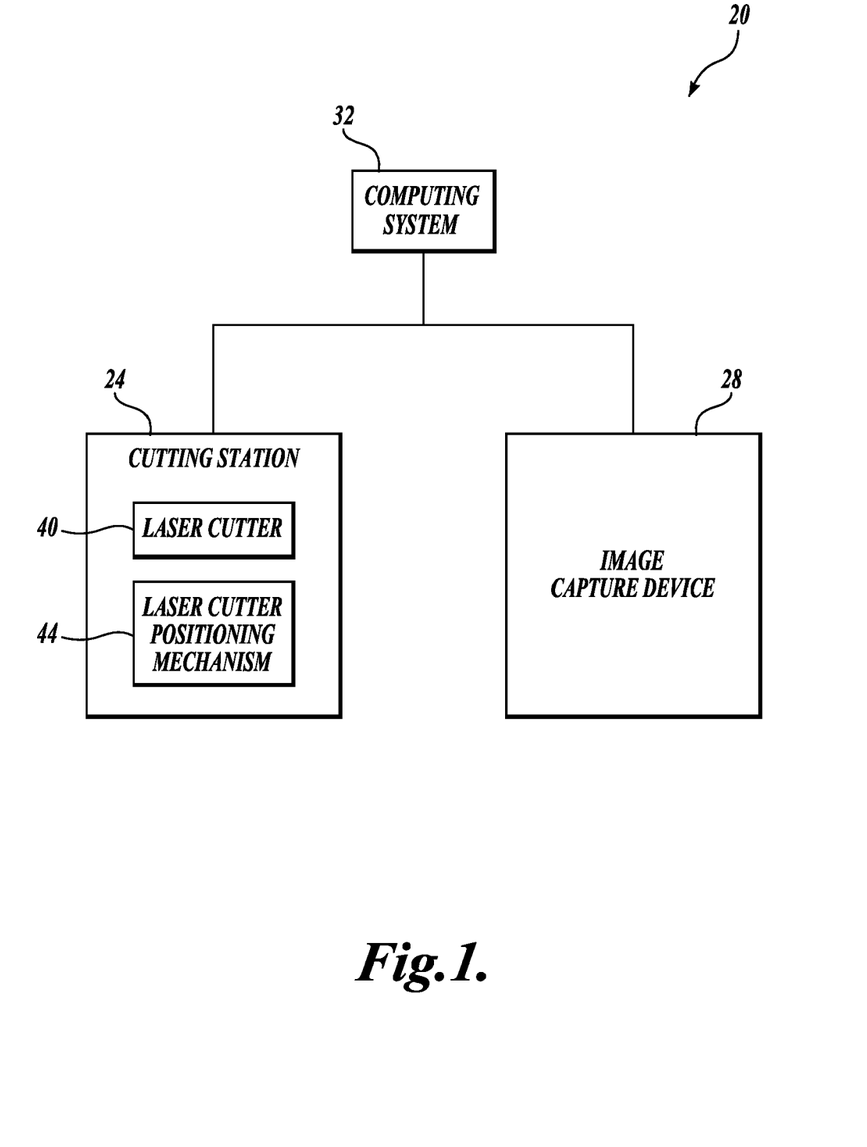
FIG. 1 is a block diagram of an exemplary embodiment of an automated adjustment system constructed in accordance with aspects of the present invention.

Turning now to FIG. 1, there is shown a block diagram of one exemplary embodiment of an automated adjustment system, generally designated 20, formed in accordance with aspects of the present invention. As best shown in FIG. 1, the system 20 includes a cutting station 24 having a laser cutter 40 for cutting surface marks, score lines, holes, slots, flaps, panels, etc. into a selected substrate, an image capture device 28 for capturing digital image data associated with the selected substrate, and a computing system 32 for controlling the cutting process. As will be described in more detail below, the computing system 32 initiates a calibration test cycle that 1) cuts a test pattern into the selected substrate; and 2) analyzes the test pattern that was cut into the selected substrate. Based on the results of the analysis of the captured image, the system 20 automatically adjusts the operational parameters of the laser cutter during a subsequent packaging production run utilizing the same substrate type.

Figure 2:
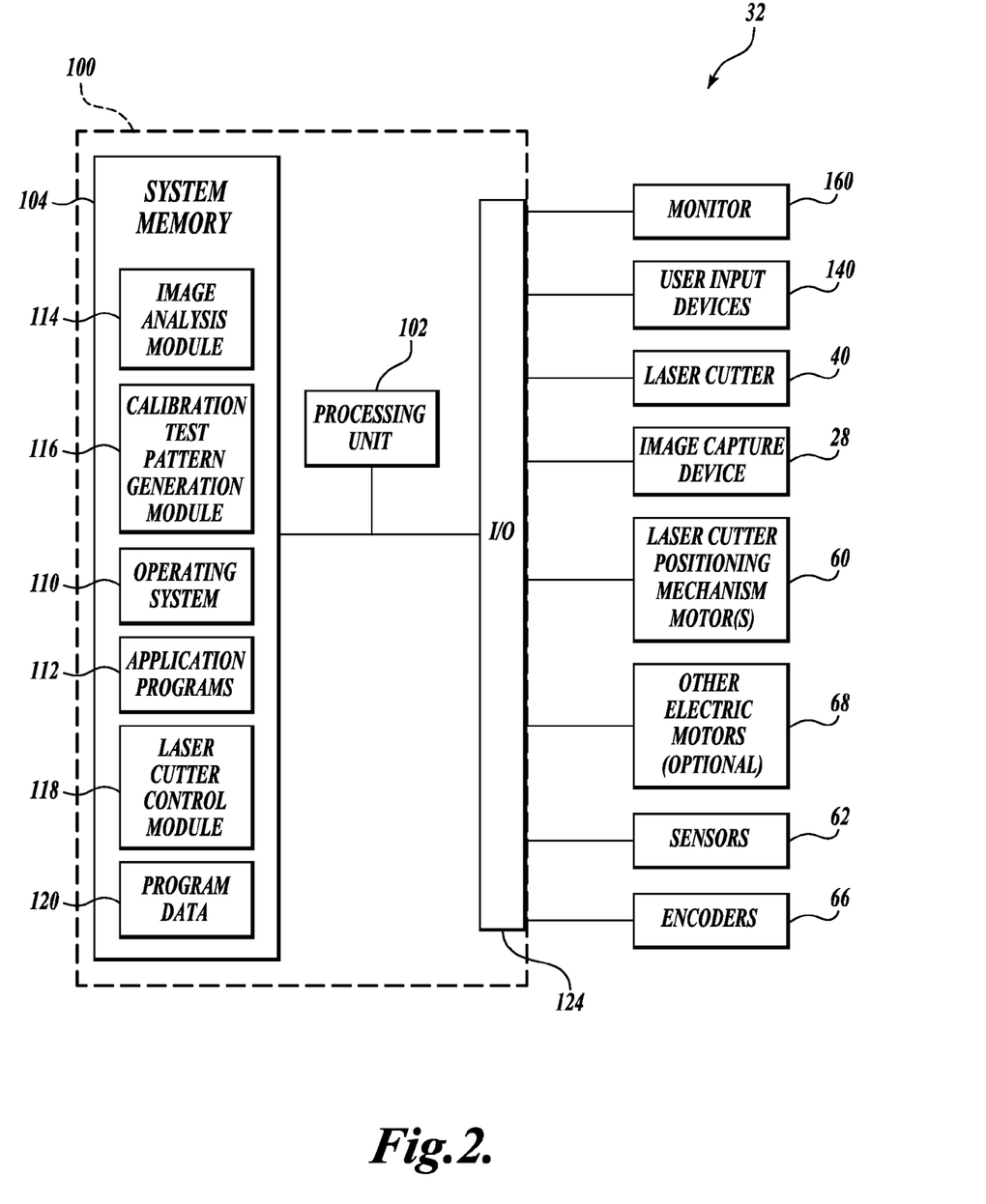
FIG. 2 is a block diagram of one exemplary embodiment of a computing system suitable for use in the system of FIG. 1.
Figure 3:
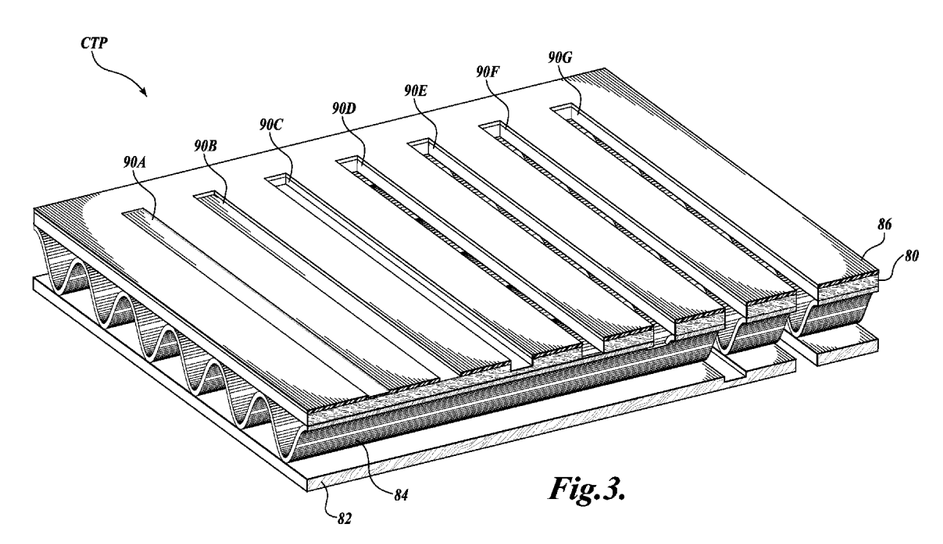
FIG. 3 is a side perspective view of one embodiment of a substrate formed in accordance with aspects of the present invention, the substrate including an exemplary embodiment of a calibration test pattern.

Referring now to FIGS. 1-3, the components of the system 20 will be described in more detail. The cutting station 24 may be any conventional laser cutting assembly suitable for use in the packaging (e.g., containerboard, fiberboard, etc.) industry that utilizes a laser cutter 40 having a selectively adjustable power output level and pulse characteristics. The cutting station 24 further comprises a frame (not shown) and a platen or bed (not shown) for supporting the substrate as the substrate is cut at the desired locations and specified depths by the laser cutter 40. The platen is supported in a stationary manner by the frame and is constructed in a conventional manner so as to allow laser light to pass therethrough. The laser cutter 40 is suspended a spaced distance above the platen by a laser cutter positioning mechanism 44. The laser cutter positioning mechanism 44 may be a robot arm, a mechanical 2D positioning mechanism, such as an XY table, or like structure. The laser cutter positioning mechanism may also include one or more mirrors (not shown) for directing the laser light to the desired locations on the substrate surface. These mirrors may be galvanometrically controlled as is known in the art. The laser cutter positioning mechanism 44 is configured and arranged for moving the laser cutter 40 at a selectively adjustable speed (laser cutting speed) in the X and Y planes with respect to the supported substrate. As such, the laser cutter 40 is capable of executing straight cuts, diagonal cuts, arcuate cuts, etc.

In operation, a sheet of substrate is placed into position on the platen of the cutting station and held firmly in place by a securement and alignment structure (not shown). For example, the sheet of substrate may be placed into the appropriate position on the platen of the cutting station either manually or via any automated feeder/conveyance means known in the art. The laser cutter then cuts the substrate at selected locations and depths according to control signals received from the computing system 32. The substrate securement and alignment structure may be used to secure the substrate in proper alignment during the cutting process. It will be appreciated that other conventional components may be utilized by the cutting station 24, including but not limited to position sensors, encoders, etc. The position sensors can be used to determine the position of the substrate prior to and during the cutting process while the encoders can be used to determine the position of the laser cutter with respect to the substrate during the cutting process.

As will be described in more detail below, the control signals are generated according to a packaging cut file stored in system memory. The packaging cut file includes data representative of cut location and cut type (e.g., surface mark, scoring line, full cut, etc.) for a particular packaging blank. For the purposes that will be described in more detail below, the laser cutter further cuts a calibration test pattern comprising a series of cut lines having a suitable width into a portion of the selected substrate prior to making the packaging cuts. Alternatively, the calibration test pattern may be cut into a representative sample of a substrate prior to the packaging substrate of the same type being placed into the cutting station 24.

The system 20 further includes an image capture device 28 for capturing calibration test pattern data from the substrate. The calibration test pattern may be comprised of a series of spaced apart cut lines of various depths and appropriate widths. The calibration test pattern is produced by the laser cutter operating at, for example, a predetermined set of operating parameters, in which each cut line of the calibration test pattern is produced by a different subset of the operational parameters. In one embodiment, the laser cutter 40 is operated at incremental power levels (e.g., 20-140 watts), laser cutting speeds (5-40 inches/second), and/or pulse characteristics (continuous wave or pulse width modulation) for producing the calibration test pattern.

FIG. 3 is a side perspective view of a substrate depicting one embodiment of a calibration test pattern CTP that may be suitable for use in several embodiments of the present invention. As best shown in FIG. 3, the calibration test pattern CTP includes a plurality of linear cut lines 90A-90G of a given width and varying depths disposed perpendicular to the flutes of the corrugated medium 84. In embodiments of the present invention, the calibration test pattern CTP will typically include linear cut lines that are representative of a surface cut, paint removal, a score line cut, and a full substrate cut, which are indicated in FIG. 3 as cut line 90A, cut line 90B, cut lines 90D or 90E, and cut line 90G, respectively. It will be appreciated that the width of the linear cut lines is selected based on illumination requirements, image analysis techniques utilized, etc.

Returning to FIG. 1, the image capture device 28 will be described in more detail. The image capture device 28 may be suspended a spaced distance above the platen in a suitable position and orientation for capturing the calibration test pattern that was cut into the substrate. In one embodiment, the image capture device may be mounted on the laser cutter positioning mechanism in proximity of the laser cutter 40 for capturing a top view of the calibration test pattern. In other embodiments, the image capture device 28 is mounted above the substrate for capturing an angled view of the calibration test pattern (for instance a viewing angle of 45 degrees to the top substrate surface). In other embodiments, the image capture device 28 is mounted to the side of the substrate edge for capturing a side view of the test pattern. In these latter embodiments, it will be appreciated that the location of the test pattern will be such that the cut lines begin or end at the substrate edge. It should also be appreciated that the image capture device 28 could be located discrete from the cutting station 24, such as a separate image capture station, or associated with other processing equipment.

The image capture device 28 is electrically connected (e.g., wired or wireless) to the computing system 32 for receiving control signals from the computing system 32 to capture an image of the substrate and for sending digital image data of the substrate to the computing system 32 for processing. The image capture device 28 may be any conventional device that upon receipt of an appropriate control signal captures images of the calibration test pattern, and generates digital data to be transferred to the computing system for image analysis. Examples of the image capturing device 28 may include but are not limited to CCD sensors, a digital camera, and a scanner. It will be appreciated that light sources or other conventional components (not shown) that may aid in the capture of the calibration test pattern may be used.

As described briefly above, the cutting station 24 and the image capture device 28 are controlled by the computing system 32. One embodiment of the computing system 32 is illustrated as a block diagram in FIG. 2. Although not required, aspects of the present invention may be described in the general context of computer-executable instructions, such as program modules, being executed by a personal computer or computing device and stored, for example, on computer readable media, as will be described below. Generally, program modules include routines, programs, objects, components, data structures, etc. that perform particular tasks or implement particular abstract data types.

The computing system 32 includes a computing device 100, including a processing unit 102 and system memory 104 suitable interconnected. The system memory 104 may include read only memory (ROM), random access memory (RAM), and storage memory. The storage memory may include hard disk drives for reading from and writing to a hard disk, a magnetic disk drive for reading from or writing to a removable magnetic disk, and an optical disk drive for reading from or writing to a removable optical disk, such as a CD, DVD or other optical media. The storage memory and their associated computer-readable media provide non-volatile storage of computer readable instruction, data structures, program modules and other data for the computing device 100. Other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary computing system.

A number of program modules may be stored on the system memory 104, including an operating system 110, one or more application programs 112, an image analysis module 114, a calibration test pattern generation module 116, a laser cutter control module 118, and program data 120, such as packaging cut files, reference patterns, substrate calibration data, and cut types value data. The calibration test pattern generation module 116 is capable of generating a calibration test pattern cut file. The generated calibration test pattern cut file includes separate location data and laser cutter operational parameter data for a set of, for example, seven (7) cut lines that when produced by the laser cutter 40, form the calibration test pattern CTP. In one embodiment, the laser cutter operational parameter data is a standard set of operational parameters for producing a suitable calibration test pattern. In several embodiments, the standard set of operational parameters is dictated by substrate type data inputted by the user in conjunction with associated substrate data stored in system memory. In the embodiments that utilize corrugated containerboard as the substrate, the cut lines will be oriented perpendicular to the flutes of the corrugated medium. As will be described in detail below, the generated calibration test pattern cut file will be utilized by the laser cutter control module 118 for cutting a calibration test pattern into the selected substrate.

The laser cutter control module 118 is capable of generating appropriate control signals for operating the laser cutter 40 upon receiving a cut file, such as a packaging cut file stored in memory or the calibration test pattern cut file generated by the calibration test pattern generation module 116. The generated control signals, when received by the laser cutter 40, causes the laser cutter 40 to produce cut lines in a selected substrate that correspond to the cut data located in the cut files. For example, upon receipt of the control signals generated by the laser cutter control module 118 in response to the calibration test pattern cut file, the laser cutter 40 produces a plurality of spaced apart cut lines utilizing, for example, a standard set of incremental power levels and/or laser cutting speeds, resulting in cut lines of various depths in the substrate. Upon receipt of the control signals generated by the laser cutter control module 118 in response to the packaging cut file, the laser cutter produces a suitable packaging blank.

It will be appreciated that the packaging cut file includes the location and type of cut to be made into the substrate. The cut types may include one or more of the following: 1) a surface cut or marking; 2) a score line cut (top linerboard cut or top linerboard cut and corrugated medium cut); and 3) full substrate cuts for cut outs, slots, etc. It will be appreciated that a cut depth, and thus operational parameters, such as power level and/or laser cutting speed to achieve such a cut depth, are associated with each type of cut.

The laser cutter control module 118 is further capable of receiving cut data from the cut type value files generated by the image analysis module 114. The cut data represents the operational parameters of the laser cutter needed to achieve each of the requisite cut types (e.g., score line cut, full cut, etc.) for the specified substrate type according to the results of the calibration test pattern analysis. The laser cutter control module 118 then assigns the operational parameter values determined by the calibration test pattern analysis to its corresponding cut type. For example, if it was determined that 60 watts of power is needed to achieve a surface mark, then the laser cutter control module 118 would assign the operational parameter value of 60 watts to such a cut type (i.e., surface marking). Based on cut data from the image analysis module 114 in conjunction with the packaging cut file received from system memory, the laser cutter control module 118 generates the appropriate control signals for modulating the operational parameters of the laser cutter 40 to achieve the desired cut depth and quality for the specified substrate type at the location and cut type specified in the packaging cut file.

The image analysis module 114 is capable of analyzing the calibration test pattern that is captured by the image capture device 28. In operation, the image analysis module compares the calibration test pattern image obtained by the image capture device 28 to the reference pattern. The reference pattern includes an image of a set of reference cuts for the specified substrate type, including 1) a surface cut; 2) a score line cut through, for example, the top liner board; 3) a score line cut through, for example, the top liner board and corrugated medium; and 4) a full cut through the entire substrate. In several embodiments, the image analysis module 118 compares cut line by cut line to the set of reference cut lines of the reference pattern. The image analysis module 114 is further capable of determining which reference cut line from the reference pattern representative of the requisite cut types corresponds to which cut line of the calibration test pattern. The image analysis module may use any conventional image analysis techniques for comparing the calibration test pattern to the reference pattern stored in system memory. Examples of image analysis techniques that may be used include but are not limited to intensity level thresholding, wavelet filtering, color component filtering, etc.

The computing system 32 is connected in electrical communication with the motor(s) 60 of the laser cutter positioning mechanism 44, the position sensors 62, encoders 66, and other conveyance mechanism motors 68, if desired, via input/output circuitry 124 or other device level circuitry. The input/output circuitry or other device lever circuitry are capable of receiving, processing, and transmitting appropriate signals between the processor and the sensors, encoders, motors, etc. The motors 60 of the laser cutter positioning mechanism 44, the position sensors 62, and the encoders 66 are capable of controlling the positioning of the laser cutter 40 during the cutting process. The computing system 32 further is connected in electrical communication with the laser cutter 40 of the cutting station 24 via the I/O circuitry 124. One such laser cutter that may be practiced with the present invention is the Orca model no. CF-1250-200, commercially available from Orca Photonic Systems, Inc., Redmond, Wash.

The computing system 32 may further include user input devices 140, such as a keyboard, a pointing device, or the like, for inputting data, such as substrate type data, into the computing system 32. The user input devices 140 are suitably connected through appropriate interfaces, such as serial ports, parallel ports or a universal serial bus (USB) of the I/O circuitry. A monitor 160 or other type of display device may also be included.

Figure 4:
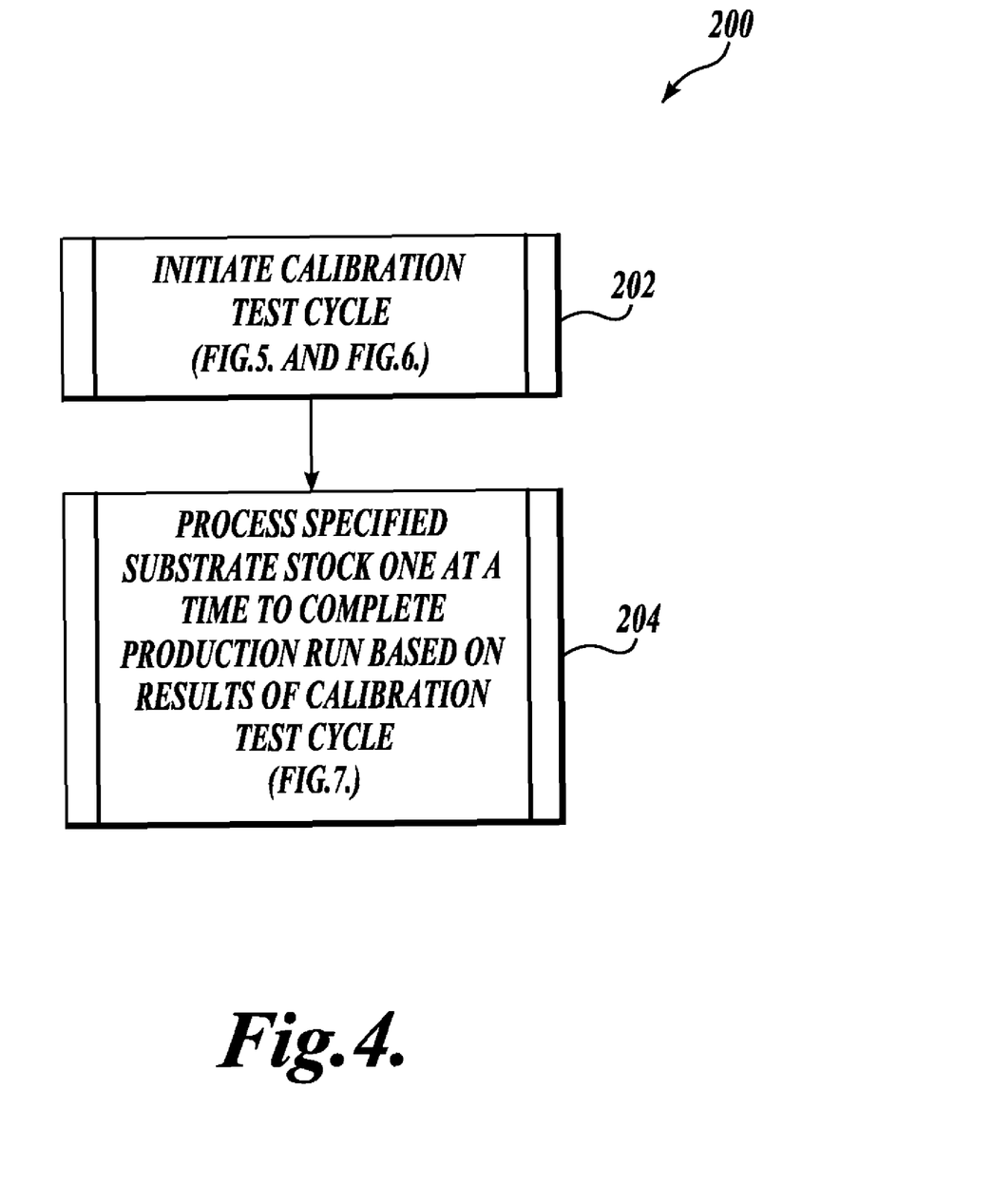
FIG. 4 is an exemplary embodiment of a process for automatically adjusting the operational conditions of a laser cutter in a package processing environment.

Examples of methods for automatically adjusting the operational parameters of a laser cutter will now be described with reference to FIGS. 1-7. Referring first to FIG. 4, there is shown one exemplary process, generally designated 200, for automatically adjusting the operational parameters of a laser cutter in a packaging process environment. At the beginning of a new packaging production run, a calibration test cycle is initiated at block 202. It will be appreciated that the new production run could be a new packaging type (e.g., point of sale display, shipping box, etc.), a new packaging substrate type (e.g., linerboard, single walled corrugated containerboard, coated containerboard, etc.), etc. The calibration test cycle includes the steps of 1) cutting a calibration test pattern into a substrate (See FIG. 5); and 2) analyzing the calibration test pattern to determine the operational parameters needed to achieve the desired types of cuts (See FIG. 6). After the results of the calibration test cycle are obtained, the cutting station 24 processes one or more sheets of substrate of the type utilized in the calibration test cycle one at a time to complete the packaging production run at block 204 (See FIG. 7).

Figure 5:
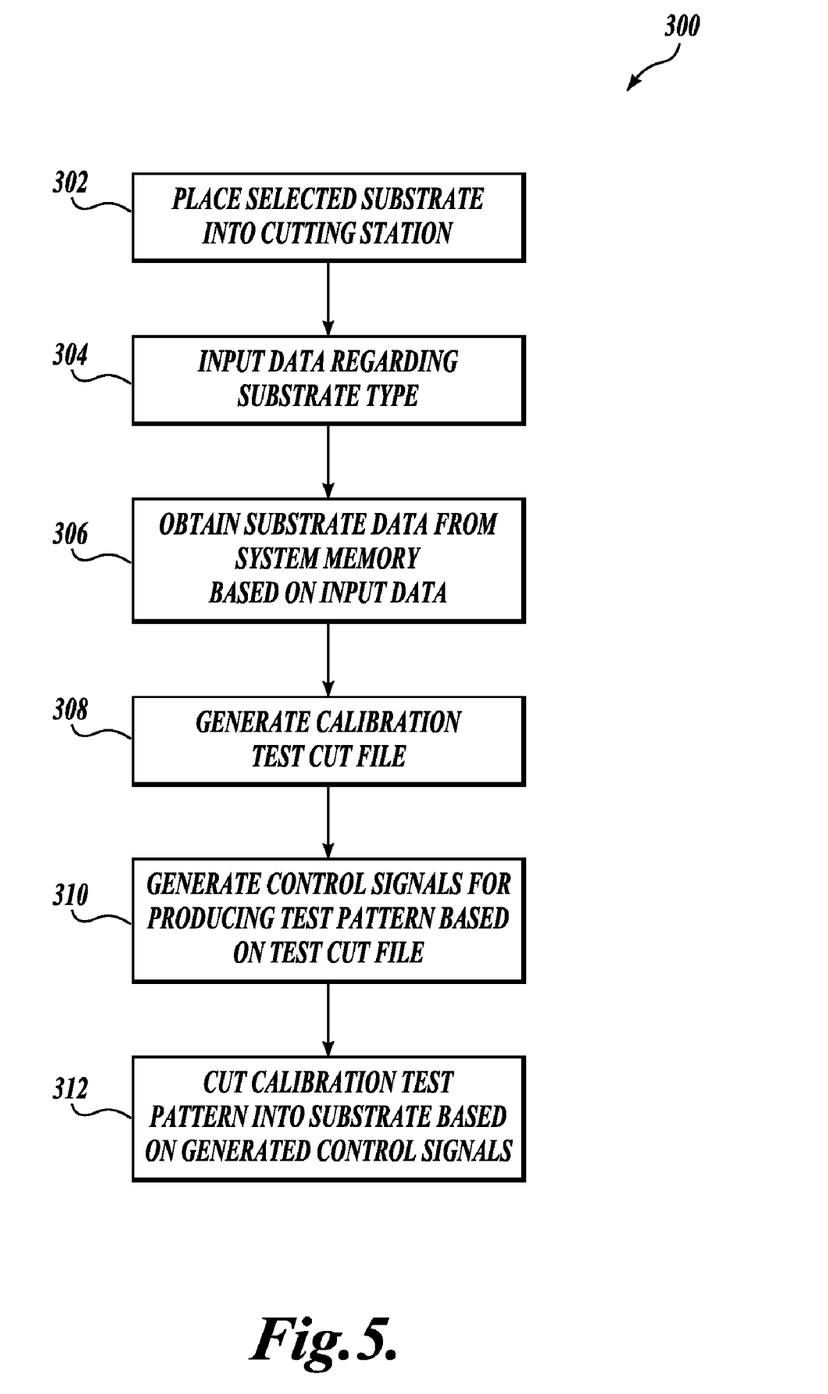
FIG. 5 is an exemplary embodiment of a sub-process for cutting a calibration test pattern into a substrate.

Turning now to FIG. 5, there is shown one exemplary embodiment of a sub-process 300 for cutting a calibration test pattern into the substrate. The sub-process 300 begins at block 302 where a sheet of substrate is placed into an appropriate cutting position at the cutting station 24. Embodiments of the substrate described herein may be formed from cellulose based substrates. Cellulose based substrates are formed from cellulose materials such as wood pulp, straw, cotton, bagasse and the like. Cellulose based substrates useful in the present invention come in many forms such as fiberboard, containerboard, corrugated containerboard and paperboard. In the exemplary embodiments described herein, the substrate is a single walled (also known as a double sided) corrugated containerboard having top and bottom linerboards 80 and 82 and a corrugated medium 84 glued therebetween (See FIG. 3). In the embodiment shown in FIG. 3, a printed layer 86 is also disposed on the top surface of the top linerboard 80. The substrate is placed into the cutting station 24 either manually, or via an automated system comprised of, for example, in-feeders and conventional conveyance means.

Next, at block 304, information about the substrate type is inputted into the computing system 32. This information can either be selected from an on-screen menu or can be entered via the user input devices as, for example, a reference number that is associated with the substrate type. For example, if a single-walled corrugated containerboard is selected for this packaging production run, the user can enter data into the computer system by selecting single-walled corrugated containerboard from a menu displayed on display 160, or by entering a reference code associated with that specific substrate type. It will be appreciated that data on subtypes of substrate types may also be utilized, such as flute types, paper grades, etc. Based on the data inputted into the computing system 32 at block 304, substrate data is obtained from system memory 104 at block 306. In one embodiment, the substrate data includes a predetermined set of operational parameters for producing the calibration test pattern. The substrate data is subsequently stored in temporary memory for use with or transmitted to the calibration test pattern module 116, as will be described in detail below. It will be appreciated that standard sets of operational parameters are stored in system memory 104 for a plurality of different substrate types. The standard sets of operational parameters have been obtained from a large sample of test data to ensure that all of the cut types will be located in the calibration test pattern that is subsequently cut into the substrate.

The sub-process 300 then proceeds to block 308, where the test pattern generation module 116 obtains the substrate data and generates a calibration test pattern cut file based on the substrate data. For example, the substrate data may indicate a set of operational parameters for a number, for example, seven cut lines. The test pattern generation module 116 uses this data to create a cut file for producing a suitable calibration test pattern. Next, at block 310, the laser cutter control module 118 generates control signals in response to the test pattern cut file. The sub-process 300 then proceeds to block 312, wherein the laser cutter cuts the calibration test pattern into a portion of the substrate as a result of suitable control signals generated by the laser cutter control module 118 and transferred to the laser cutter 40. As described in detail above, the calibration test pattern is a set of cut lines formed by the laser cutter 40 at incremental power levels and/or laser cutting speeds. The calibration test pattern may be located along any portion of the side, top, or bottom of the substrate. It will be appreciated that the calibration test pattern is cut on portions of the substrate that will be subsequently discarded, e.g., cut away, from the final product.

Figure 6:
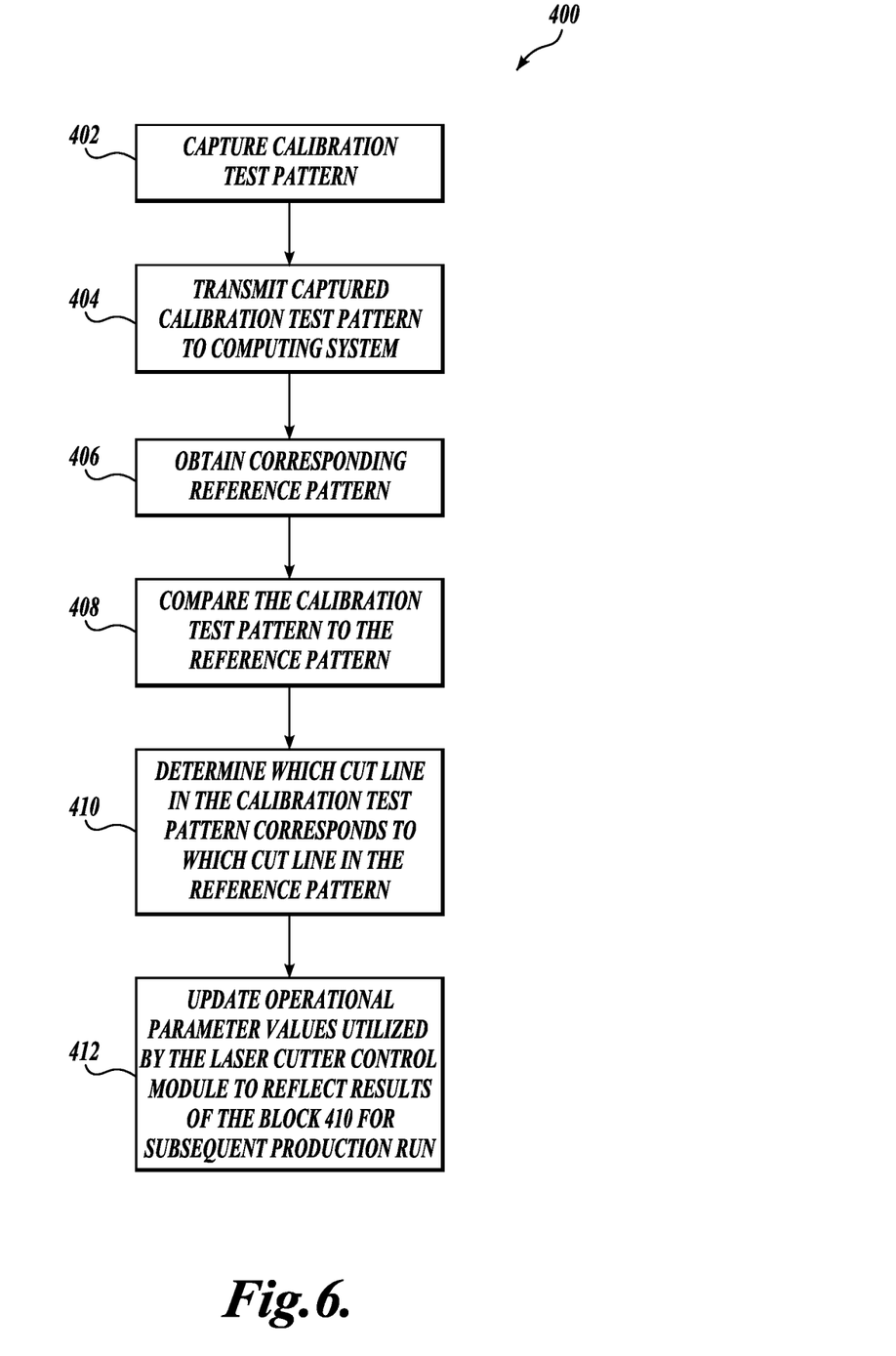
FIG. 6 is an exemplary embodiment of a sub-process for analyzing a calibration test pattern to determine the operational parameters needed to achieve the desired types of cuts.

Turning now to FIG. 6, there is shown an exemplary embodiment of a sub-process 400 for analyzing the calibration test pattern to determine the operational parameters needed to achieve the desired types of cuts. After the calibration test pattern is cut into the substrate, the sub-process 400 begins at block 402, where image data of the calibration test pattern is captured by the image capture device 28. Once the calibration test pattern is captured by the image capture device 28 at block 402, the sub-process 400 continues to block 404. At block 404, the captured image is transmitted to the computing system 32 for analysis by the image analysis module 114. For example, once a digital image of the calibration test pattern is captured, the digital image representing the calibration test pattern is transferred to the computing system 32 where it is analyzed by an image analysis routine executed by the image analysis module 114. It will be appreciated that the image analysis module 114 may use any conventional image analysis techniques for analyzing the captured test pattern.

The sub-process 400 continues to block 406 where an image of a reference pattern corresponding to the substrate type is obtained from system memory 104. The reference pattern image includes a set of reference cut lines for the specified substrate type, including, for example, 1) a surface cut line; 2) a score cut line through, for example, the top liner board; 3) a score cut line through, for example, the top linerboard and corrugated medium; and 4) a full cut line through the entire substrate. It will be appreciated that the image analysis module 116 may obtain information from the calibration test pattern generation module 116 or the information inputted by the user and stored in system memory regarding the substrate type so that an appropriate reference pattern is obtained.

Next, at block 408, the calibration test pattern is compared to the reference pattern. In several embodiments, the image analysis module 118 compares cut line by cut line to the set of reference cut lines of the reference pattern. The sub-process proceeds to block 410 where a determination is made as to which reference cut line representative of the requisite cut types from the reference pattern corresponds to which of the cut lines of the calibration test pattern. It will be appreciated that the image analysis module may choose the closest cut line in the calibration test pattern for obtaining the operational parameters needed to achieve such a cut type or may interpolate or extrapolate to find such operational parameters. Next, at block 412, the operational parameter values that correspond with the cut types determined in block 410 for the substrate are assigned to the cut type values file and stored in system memory 104 to be accessed by the laser cutter control module 118 for the packaging production run.

Figure 7:
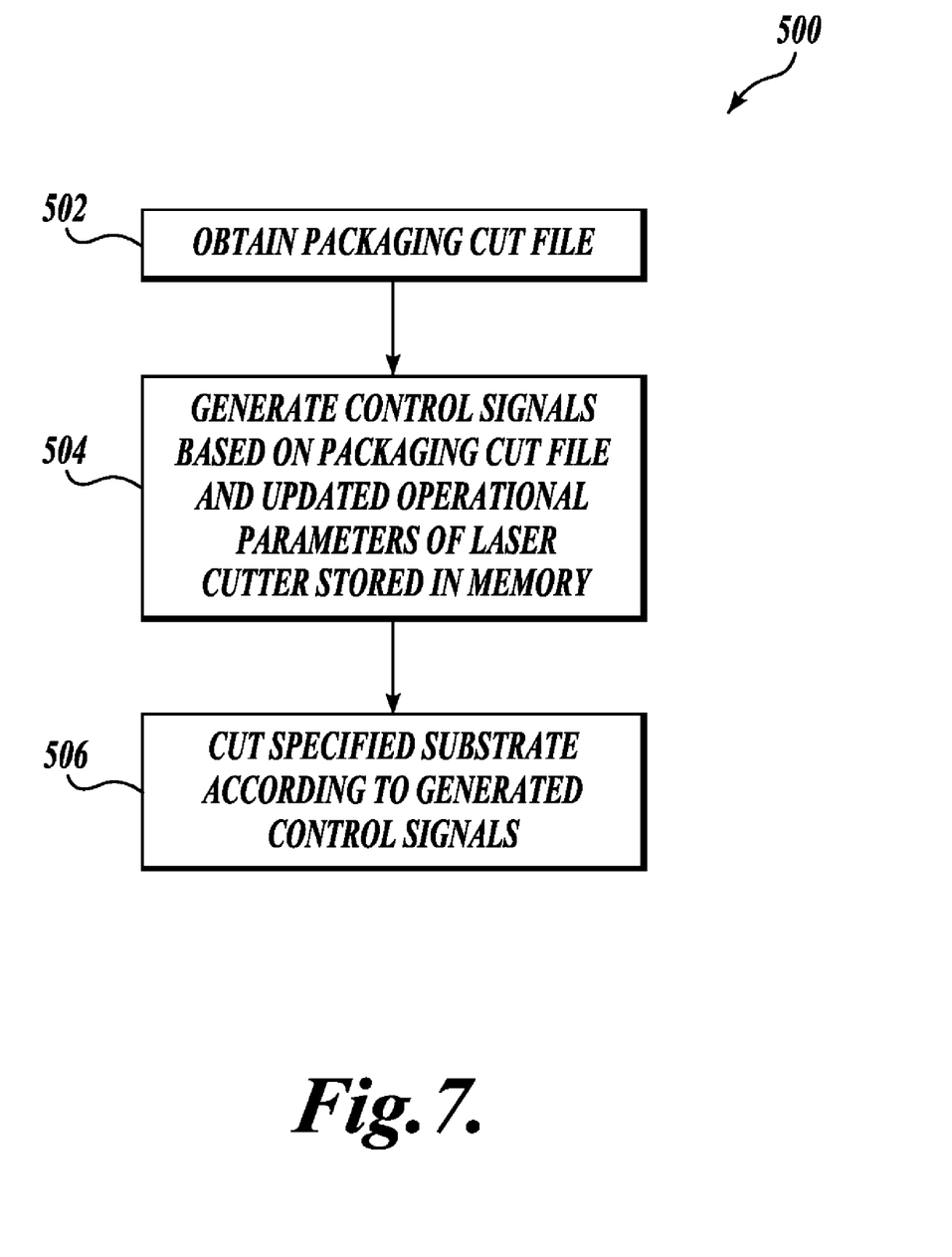
FIG. 7 is an exemplary embodiment of a sub-process for processing a specified substrate one at a time to complete the packaging production run.

Once the operational parameter values are assigned to the cut type values file, the calibration test cycle is complete and the system 20 is ready to process the packaging production run. Turning now to FIG. 7, there is shown an exemplary embodiment of a sub-process 500 for processing the specified substrate one at a time to complete the packaging production run. The sub-process 500 begins at block 502 where a sheet of substrate of the type utilized in the calibration test cycle is placed into an appropriate cutting position at the cutting station 24. The substrate can be placed into the cutting station either manually, or via an automated system comprised of, for example, in-feeders and conventional conveyance means. Next, at block 504, the packaging cut file is read by the laser cutter control module 118 in conjunction with the cut type values file that resulted from the calibration test cycle. The laser cutter control module 118 then generates at block 508 the appropriate control signals based on the packaging cut file and cut type values file and transmits the control signals to the laser cutter 40. Upon receipt of the control signals from block 508, the substrate is suitably processed into a packaging blank at block 510.

After the sheet of substrate is processed at the cutting station 24, the substrate may be further transferred either manually or by any conventional conveyor systems for further processing. Further processing may include but is not limited to printing, folding, gluing, etc. in order to form the final product. It will be appreciated that the substrate may be pre-processed prior to being placed into the cutting station 24. Such pre-processes include but are not limited to printing, scoring, etc.

Although the present invention has been described herein with reference to exemplary embodiments illustrated in the attached drawings, it is noted that substitutions may be made and equivalents employed herein without departing from the scope of the invention as recited in the claims.

The embodiments of the invention in which an exclusive property or privilege is claimed are defined as follows:

1. A method for automatically adjusting the operational parameters of a laser cutter, comprising:
   cutting a calibration test pattern into a substrate by a laser cutter, the substrate being defined by a laminate structure in the form of a corrugated container board having a top liner board, a bottom liner board, and a corrugated medium disposed therebetween and wherein the calibration test pattern includes a plurality of spaced apart cuts of varying depths;
   capturing data representative of the test pattern prior to analyzing the calibration test pattern;
   analyzing the calibration test pattern cut into the substrate utilizing computerized image analysis wherein analyzing the calibration test pattern includes comparing the calibration test pattern captured by an image capturing device with a reference image having one or more of the desired cut depths wherein the desired cut depths include
   (a) a depth of cut sufficient for surface marking,
   (b) a depth of cut sufficient for removal of the top liner board,
   (c) a depth of cut sufficient for cutting through the top liner board and the corrugated medium, and
   (d) a depth of cut sufficient for cutting through entire substrate; and
   modulating the laser cutter during a subsequent processing of the substrate.

2. The method of claim 1, wherein the operational parameters are selected from a group consisting of laser power, laser cutting speed, pulse characteristics, and combinations thereof.

3. The method of claim 1, wherein the calibration test pattern is formed by incrementally altering one or more operational parameters of the laser cutter.

4. The method of claim 1, wherein the image capture device is selected from a group consisting of a CCD sensor, a digital camera, and a scanner.

5. A method for automatically adjusting the operational parameters of a laser cutter in a packaging process environment, comprising:
   inputting data indicative of a substrate, the substrate being defined by a laminate structure in the form of a corrugated container board having a top liner board, a bottom liner board, and a corrugated medium disposed therebetween;
   generating calibration test pattern control signal based on the inputted data;
   controlling a laser cutter with the control signals for cutting a calibration test pattern into the substrate;
   receiving image data representative of the calibration test pattern, the calibration test pattern includes comparing the calibration test pattern captured by an image capturing device with a reference image having one or more of the desired cut depths wherein the desired cut depths include
   (a) a depth of cut sufficient for surface marking,
   (b) a depth of cut sufficient for removal of the top layer,
   (c) a depth of cut sufficient for cutting through the top layer and the corrugated medium, and
   (d) a depth of cut sufficient for cutting through entire substrate;
   analyzing the image data; and
   controlling subsequent cutting of one or more substrates based on the analyzed image data.

* * * * *